(12) United States Patent
Cox et al.

(10) Patent No.: US 8,532,957 B2
(45) Date of Patent: Sep. 10, 2013

(54) AIRCRAFT WEIGHT ESTIMATION METHOD

(75) Inventors: Isaiah Watas Cox, Baltimore, MD (US); Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 292 days.

(21) Appl. No.: 12/069,614

(22) Filed: Feb. 11, 2008

(65) Prior Publication Data

US 2008/0312870 A1 Dec. 18, 2008

Related U.S. Application Data

(60) Continuation-in-part of application No. 11/596,157, filed as application No. PCT/US2005/016571 on May 11, 2005, now abandoned, application No. 12/069,614, which is a continuation-in-part of application No. 11/630,293, filed as application No. PCT/US2005/022011 on Jun. 21, 2005, now Pat. No. 7,928,683, and a continuation-in-part of application No. 11/029,978, filed on Jan. 4, 2005, now Pat. No. 7,116,019, which is a division of application No. 10/132,936, filed on Apr. 26, 2002, now Pat. No. 6,838,791, and a continuation-in-part of application No. 09/713,654, filed on Nov. 15, 2000, now Pat. No. 6,657,334, application No. 12/069,614, which is a continuation-in-part of application No. 11/792,967, filed as application No. PCT/US2005/045409 on Dec. 13, 2005, now Pat. No. 8,258,665, application No. 12/069,614, which is a continuation-in-part of application No. 11/918,914, filed as application No. PCT/US2006/012483 on Apr. 5, 2006, now Pat. No. 7,852,037.

(60) Provisional application No. 60/900,601, filed on Feb. 9, 2007, provisional application No. 60/570,578, filed on May 12, 2004, provisional application No. 60/286,862, filed on Apr. 26, 2001, provisional application No. 60/635,767, filed on Dec. 13, 2004, provisional application No. 60/737,587, filed on Nov. 16, 2005, provisional application No. 60/673,021, filed on Apr. 19, 2005, provisional application No. 60/581,789, filed on Jun. 21, 2004.

(51) Int. Cl.
*G01G 19/00* (2006.01)

(52) U.S. Cl.
USPC ............... 702/173; 702/175; 244/135 A

(58) Field of Classification Search
USPC .................... 702/173, 175; 244/135 A
See application file for complete search history.

(56) References Cited

U.S. PATENT DOCUMENTS 2,320,547 A 6/1943 Tiger
(Continued)

FOREIGN PATENT DOCUMENTS

EP 0756556 B1 9/1999
(Continued)

OTHER PUBLICATIONS

Klingshirn, "High Phase order induction motors—Part I—Description and theoretical considerations," IEEE Transactions on Power Apparatus and systems, vol. PAS-102, No. 1 (1983).*
(Continued)

*Primary Examiner* — Jonathan C Teixeira Moffat
*Assistant Examiner* — Hyun Park

(57) ABSTRACT

A method of measuring the weight of an aircraft is disclosed. The method comprises, in a self-propelled aircraft undercarriage having a electrical rotating machine, the steps of: measuring the current and voltage going into the rotating machine using current and voltage measuring means, calculating the power into the rotating machine, measuring the speed (or torque or acceleration) of said machine using speed sensing means, and comparing the power and speed (or torque or acceleration) results with a database of power and speed relationships of comparable aircraft of varying weights.

20 Claims, 7 Drawing Sheets

(56) References Cited

U.S. PATENT DOCUMENTS

| | | | |
|---|---|---|---|
| 2,460,387 A | 2/1949 | Hunter | |
| 2,631,476 A | 3/1953 | Ravigneaux | |
| 2,687,857 A | 8/1954 | Caldwell et al. | |
| 3,088,699 A | 5/1963 | Larson | |
| 3,109,324 A | 11/1963 | Locher | |
| 3,584,503 A * | 6/1971 | Senour | 73/65.06 |
| 3,604,255 A * | 9/1971 | Bart | 73/862.28 |
| 3,701,279 A * | 10/1972 | Harris et al. | 73/65.06 |
| 3,711,043 A | 1/1973 | Cameron-Johnson | |
| 3,764,094 A | 10/1973 | Cross | |
| 3,807,664 A | 4/1974 | Kelly, Jr. et al. | |
| 3,850,389 A | 11/1974 | Dixon | |
| 3,874,618 A | 4/1975 | Bates | |
| 3,977,631 A | 8/1976 | Jenny | |
| 4,115,755 A * | 9/1978 | Cotton | 340/946 |
| 4,300,200 A * | 11/1981 | Doe | 702/144 |
| 4,490,802 A * | 12/1984 | Miller | 702/175 |
| 4,639,872 A * | 1/1987 | McHale et al. | 701/124 |
| 4,659,039 A | 4/1987 | Valdes | |
| 4,709,882 A * | 12/1987 | Galbraith | 244/53 R |
| 4,809,174 A * | 2/1989 | Momenthy | 701/3 |
| 5,086,994 A | 2/1992 | Donnelly et al. | |
| 5,104,063 A | 4/1992 | Hartley | |
| 5,225,744 A * | 7/1993 | Ishikawa et al. | 318/139 |
| 5,548,517 A * | 8/1996 | Nance | 701/124 |
| 5,860,620 A * | 1/1999 | Wainfan et al. | 244/12.1 |
| 5,875,994 A | 3/1999 | McCrory | |
| 6,411,890 B1 | 6/2002 | Zimmerman | |
| 6,657,334 B1 | 12/2003 | Edelson | |
| 6,690,295 B1 | 2/2004 | De Boer | |
| 6,691,004 B2 * | 2/2004 | Johnson et al. | 701/14 |
| 6,831,430 B2 | 12/2004 | Edelson | |
| 6,838,791 B2 | 1/2005 | Edelson | |
| 6,922,037 B2 | 7/2005 | Edelson | |
| 6,923,375 B2 * | 8/2005 | Stefani | 235/462.01 |
| 7,116,019 B2 | 10/2006 | Edelson | |
| 2003/0075998 A1 | 4/2003 | Edelson | |
| 2004/0059497 A1 | 3/2004 | Sankrithi | |
| 2004/0094662 A1 * | 5/2004 | Sanders et al. | 244/12.5 |
| 2005/0116570 A1 | 6/2005 | Edelson | |
| 2005/0253020 A1 | 11/2005 | McCoskey et al. | |
| 2005/0253021 A1 | 11/2005 | McCoskey et al. | |
| 2006/0065779 A1 | 3/2006 | McCoskey et al. | |
| 2006/0243855 A1 | 11/2006 | Pradier | |
| 2006/0255555 A1 | 11/2006 | Lindahl | |
| 2006/0273686 A1 | 12/2006 | Edelson et al. | |
| 2007/0012106 A1 | 1/2007 | Mardirossian | |
| 2007/0164168 A1 * | 7/2007 | Hirvonen et al. | 244/223 |
| 2007/0255489 A1 * | 11/2007 | Jensen et al. | 701/124 |
| 2008/0054733 A1 | 3/2008 | Edelson | |

FOREIGN PATENT DOCUMENTS

| | | | |
|---|---|---|---|
| GB | 2210833 A * | 6/1989 | |
| WO | WO-2005/035358 A2 | 4/2005 | |
| WO | WO 2005035358 A2 * | 4/2005 | |
| WO | WO-2005/112584 A2 | 12/2005 | |
| WO | WO-2006/002207 A2 | 1/2006 | |
| WO | WO-2006/065988 A2 | 6/2006 | |
| WO | WO-2006/078322 A2 | 7/2006 | |
| WO | WO-2006/113121 A1 | 10/2006 | |

OTHER PUBLICATIONS

JP-2001-304948, Kato et el., (Abstract only) English translated.*

* cited by examiner

AIRCRAFT WEIGHT ESTIMATION METHOD

CROSS-REFERENCE TO RELATED APPLICATIONS

This application claims the benefit of U.S. Provisional Patent Application No. 60/900,601, filed Feb. 9, 2007. This application is also a Continuation-in-Part of U.S. patent application Ser. No. 11/596,157, filed Nov. 10, 2006, which is the U.S. national stage application of International Application No. PCT/US2005/016571, filed May 11, 2005, which international application was published on Dec. 1, 2005, as International Publication WO2005/112584 in the English language. The International Application claims the benefit of Provisional Patent Application No. 60/570,578, filed May 12, 2004. This application is also a Continuation-in-Part of U.S. patent application Ser. No. 11/630,293, filed Dec. 19, 2006, which is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-part of U.S. patent application Ser. No. 11/029,978, filed Jan. 4, 2005, which is a Divisional of U.S. patent application Ser. No. 10/132,936 filed Apr. 26, 2002, and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000. This application is also a Continuation-in-Part of U.S. patent application Ser. No. 11/792,967, filed Jun. 13, 2007, which is the U.S. national stage application of International Application No. PCT/US2005/045409, filed Dec. 13, 2005, which international application was published on Jun. 22, 2006, as International Publication WO/2006/065988 in the English language. The International Application claims the benefit of U.S. Provisional Patent Application No. 60/635,767, filed Dec. 13, 2004, and U.S. Provisional Patent Application No. 60/737,587, filed Nov. 16, 2005. This application is also a Continuation-in-Part of U.S. patent application Ser. No. 11/918,914, filed Oct. 19, 2007, which is the U.S. national stage application of International Application No. PCT/US2006/012483, filed Apr. 5, 2006, which international application was published on Oct. 26, 2006, as International Publication WO/2006/113121 in the English language. The International Application claims the benefit of U.S. Provisional Patent Application No. 60/673,021, filed Apr. 19, 2005. The above-mentioned documents are incorporated herein by reference in their entirety.

BACKGROUND OF THE INVENTION

The present invention relates to methods for estimating the weight of aircraft, and more particularly relates to estimating such weight without significantly moving the aircraft.

The estimation of the weight of an aircraft loaded with passengers, luggage, and other cargo is problematic and most methods rely on complex additional machinery to measure the load on the struts.

For example, in U.S. Patent Appl. Pub. No. 2007/012106 Mardirossian discloses a method and/or system for operating an aircraft, including (a) before an aircraft is loaded with passengers and luggage, performing a first measuring to measure a load on front landing gear strut(s) and rear landing gear strut(s) in order to obtain first weight data; and (b) after the aircraft has been loaded with passengers and luggage, performing a second measuring to measure a load on front landing gear strut(s) and rear landing gear strut(s) in order to obtain second weight data. Then, the first weight data is subtracted from the second weight data, while optionally compensating for fuel added to the aircraft between the times of the first and second measuring steps, in order to determine a total weight of the passengers and luggage on the aircraft. This total weight can be used in determining whether or not the plane is overloaded.

Similarly in U.S. Patent Appl. Pub. No. 2006/243855 Pradier discloses a method and device for determining the weight and/or a characteristic value of the position of the center of gravity of an aircraft standing on the ground by means of a plurality of undercarriages, each undercarriage including at least one structural element exhibiting a variable level of stresses depending on the fraction of the weight of the aircraft transmitted to the ground through the undercarriage. The method includes the steps of a) measuring on each undercarriage at least one parameter representing the stress level of the element; and b) evaluating the characteristic value and/or the weight according to the parameters measured in step a). At least one parameter measured in step a) is a magnetic or electrical characteristic of the structural element of the undercarriage.

Thus it can be seen that it would be advantageous to provide a method of weighing an aircraft without adding extra machinery to the aircraft, and to provide such data in an integrated, automated system capable of leveraging aircraft weight data to maximize performance or efficiency of the aircraft.

WO2005/035358 and WO2006/078322 disclose approaches to ground movement of aircraft by means of electric wheel motors. These utilize compact motor-generator machines able to provide high torque at low speed.

WO2005/112584 discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

WO2006/002207 discloses a motor-generator machine comprising a high phase order AC machine with short pitch winding. In the following, H is the harmonic order of a waveform, N is the number of turns in a winding, and A is the span value of a mesh connected stator winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection.

The term 'winding' therein refers to the group of all of the windings and/or coils and/or conductors of a single phase, unless otherwise specified. The winding that constitutes each phase consists of a 'supply half' and a 'back half'. The 'supply half' is driven by the power supply, and has a phase angle dependent on the power supply phase or phases to which it is connected. The phase angle of the back half of each phase is equal to the phase angle of the supply half, offset by 180 ED. The pitch of a winding is the number of rotational degrees between the supply half of the winding and the back half of the winding.

Recommended therein is a way of making the winding shorter and at the same time making the magnetomotive force more sinusoidal, by using short pitch windings, and by distributing the winding over several slots. When the coils of the winding are distributed over several slots, there is a reduction in the combined induced electromotive force. The individual coils of each winding will have a different spatial orientation due to the slots and there will be a phase difference between them.

Concentrated windings may also be used, wherein the coils of each half of a winding are contained in one slot only.

A method for operating a high phase order induction motor is also disclosed therein, involving electrically connecting N windings into a mesh connection with a value of A that provides a substantial range in speed/torque relation when operating with at least two out of first, second and third harmonic, low order harmonics being the most efficient.

The above disclosure is further directed to selection of a winding pitch that yields a different chording factor for different harmonics. The aim is to select a chording factor that is optimal for the desired harmonics.

WO2006/065988 discloses a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them.

In one embodiment of this motor-generator machine, an AC electrical rotating apparatus is composed of: a rotor, a substantially cylindrically shaped stator that has one surface that faces the rotor, and a number of conductive coils. Each coil is disposed in a loop wound toroidally around the stator. A drive means, for example an inverter, provides more than three different drive phases to the coils. In a further embodiment, the machine is equipped with teeth or slots for lending firm support to said coils. The slots may be on the stator surface that faces the rotor or also on the opposite stator surface. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a further alternative, where two coils or more have a 180 electrical degree phase angle difference between them, they may be connected in anti-parallel to the same drive phase.

The AC machine coils may be connected and driven in a number of ways, including but not restricted to: a star connection and a mesh connection. It is preferable that the drive means, for example, the inverter, be capable of operating with variable harmonic drive, so that it may produce the impedance effect. In one embodiment, the coils are connected with short pitch windings. In a preferred embodiment, the coils are connected to be able to operate with 2 poles, or four poles, under H=1 where H is the harmonic order of the drive waveform. The coils may be connected together in series, parallel, or anti-parallel.

In U.S. Patent Appl. Pub. No. 2006/0273686, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle.

Such a machine may be located inside a vehicle drive wheel, and allows a drive motor to provide the necessary torque with reasonable system mass. In one embodiment the stator coils are wound around the inside and outside of the stator. In a further embodiment, the machine contains a high number of phases, greater than three. In a further embodiment, the phases are connected in a mesh connection. In a further embodiment, each half-phase is independently driven to enable second harmonic drive for an impedance effect. Improvements are apparent in efficiency and packing density.

WO2006/113121 discloses a motor-generator machine comprising an induction and switched reluctance motor designed to operate as a reluctance machine at low speeds and an inductance machine at high speeds. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor structure reacts to a particular drive waveform harmonic to produce a reluctance torque that rotates the rotor. For a different harmonic drive, substantially negligible reluctance torque is produced but induction based torque is produced to rotate the rotor. The rotor and stator may have a different high number of very small teeth causing the rotor to move much more slowly than the magnetic poles. The rotor may be designed with a number of salient poles or flux guides that produces substantial reluctance torque under the operation of a magnetic field of a certain pole count, but produces negligible reluctance torque, and substantial inductance-based torque, under the operation of a second magnetic field with a second pole count. The stator windings may be connected mesh or may be wrapped in a toroidal fashion around the stator.

It can be seen from the above that it would be advantageous to use such motor-generator machines in an aircraft undercarriage to estimate the weight of an aircraft, thereby providing extra functionality without adding extra machinery to an aircraft where space and weight are at a premium.

BRIEF SUMMARY OF THE INVENTION

It is an object of the present invention to provide a method of estimating the weight of an aircraft.

A method of measuring the weight of an aircraft is disclosed. The method comprises, in an aircraft undercarriage fitted with an electrical rotating machine which propels said aircraft, the steps of: measuring the current and voltage going into the rotating machine using current and voltage measuring means, calculating the power into the rotating machine, measuring a reaction of said aircraft using reaction sensing means, and comparing the power and reaction results with a database of power and reaction relationships of comparable aircraft of varying weights.

Said electrical rotating machine fitted in said aircraft undercarriage is preferably one of the motor-generator machines described in the prior art section of this patent, or another motor-generator machine which is capable of propelling said aircraft.

Said reaction may be speed, acceleration, torque, or any other reaction of said aircraft to the inputted power.

DETAILED DESCRIPTION OF THE INVENTION

Figure 1:
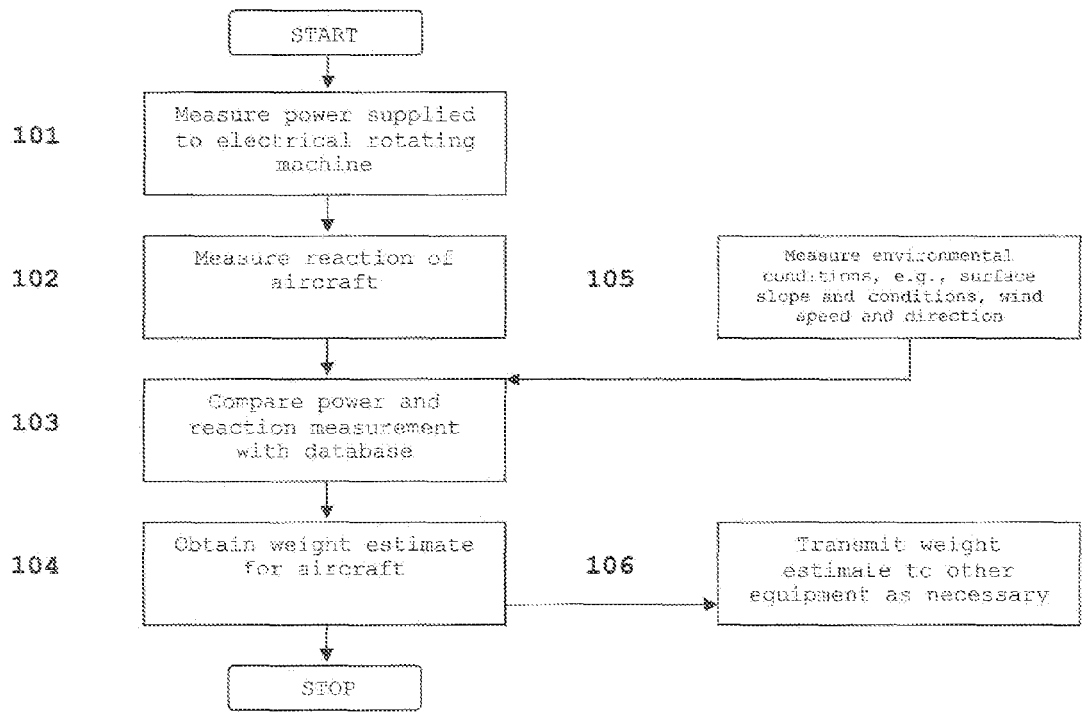
FIG. 1 shows an example of a method according to the present invention.

Referring now to FIG. 1, which is a flow-chart representing the method of the present invention, in a first step 101 power is supplied to the electrical rotating machine powering the undercarriage, and the amount of power supplied is measured. Power supplied to the electrical rotating machine may be may be measured directly using a shaft encoder and torque sensor, or it may be measured indirectly, for example, by measuring the current and voltage supplied to the electrical rotating machine. The current supplied may be measured using a current sensor, an ammeter or any known current measuring means. Voltage applied may be measured using a voltage sensor, a voltmeter or any known voltage measuring means. Power may then be calculated by multiplying current by voltage.

In a second step 102 the reaction of the aircraft in response to the application of the power is measured. The reaction may be any change in the behavior of the aircraft, and is preferably speed, acceleration or torque, taken singly or in combination.

Thus, in one preferred embodiment of the invention, the reaction to be measured is the speed of the aircraft and this is determined using speed sensing means. Preferably, though not exclusively, the speed sensing means are ones that are built into the aircraft systems, such as, for example and without limitation, the GPS or airport radar grid, or aircraft air data instruments. An advantage of this is that no extra speed sensors are required. Speed may also be measured using any other form of speed sensor or speed sensing means known in the art. Speed sensing means may take input from other ground speed measuring instruments, and may be mechanical, electronic, or software based. One or more of the above sensing means may be provided and an average result may be calculated and used as the final aircraft speed. Alternatively or additionally, aircraft speed may be obtained indirectly by measuring the speed of a component, such as the speed of the wheel, tire, gears, or any other component rotating with a speed proportional to the speed of said aircraft, and calculating the aircraft speed using additional known parameters, such as tire diameter). Thus the rotational velocity may be inferred from the input speed (in Hz) and known or measured slip (difference between input frequency and output speed) of said electrical rotating machine. Rotational velocity of the electrical rotating machine may also be measured by applying a slight magnetic field to the rotating machine: if the rotating machine is spinning because the aircraft is moving along the ground, this will cause electricity to be generated in the rotating machine and be fed back to the inverter. The amount of electricity produced is proportional to, and can be used to determine, the speed of the aircraft. If the rotating machine is not spinning, no current is generated.

In a further preferred embodiment of the invention, the reaction to be measured is the acceleration of the aircraft and the reaction sensing means are acceleration sensing means able to determine the change in speed per unit of time. Speed measurement techniques are described in embodiment above. Acceleration may be measured by taking several speed measurements, using any method of the previous embodiment, at several regular time intervals, and calculating the change in speed with respect to time. Alternatively, acceleration may be determined indirectly by measuring the acceleration of the rotating electrical machine, for example and without limitation, by measuring slip internal to the rotating electrical machine. Acceleration may also be determined indirectly by measuring the acceleration of any other component, such as the wheel, tire, gears, or any other component accelerating with an acceleration proportional to the acceleration of the aircraft. Furthermore, acceleration may be measured or calculated using any technique known to the art.

In a further preferred embodiment of the invention, the reaction to be measured is torque and the reaction sensing means are torque-sensing means. Torque may be measured using any sensor known to the art, including, for example and without limitation, a reactionary torque cell, a rotary torque cell, or a torque watch gauge. The torque-sensing means may be an integral part of the electrical rotating machine or may be provided for this purpose. Force measuring means may be used to measure the force required to produce motion at a particular point, and this force may be multiplied by a known distance from the pivot of the force, to give the torque. Torque may be measured at any point within the rotating machine, within the gears attached to the rotating machine, on the aircraft wheel, or any point which displays torque proportional to that delivered by the rotating machine.

In a third step 103 the power supplied and the reaction produced is compared to a database containing information about the behavior of the aircraft with respect to applied power and reaction produced at different aircraft loadings. The database is typically a collection of the reaction/power relationships of many models of aircraft on many surfaces with various cargo loads (and thus a range of weights). The database may be stored electronically and be operable using appropriate software, or it may be stored physically and be operable manually.

In a fourth step 104 an estimate of the weight of the aircraft is obtained from the comparison made at the third step. To produce the best estimated weight, the power and reaction results are compared with the results in the database for the same model of aircraft on the same surface (or the most similar model and surface if these are not available), to determine the weight of the aircraft in question. Preferably, each time an estimate is made, and the weight of the aircraft may be independently verified, the result is added to the database and stored. Thus, as the database grows, the estimates become increasingly precise. The database may initially be built from repeated instances of pilots inputting weights of aircrafts, in various conditions, where said weights are known from other sources. In a preferred embodiment, the database is electronically stored and software is used to automatically compare the power and reaction results with the database and automatically return a result for the aircraft estimated weight. The result may be visible on an LED or VDU or MFD cockpit display, where it may be seen by the flight-deck crew and/or it may be visible on or near the electrical rotating machine or undercarriage where it may be seen by the ground staff. In a further preferred embodiment the database comprises physical tables, graphs or the like and the power and reaction results are manually compared with the database to provide an estimated weight of the aircraft.

Referring again to FIG. 1, in which a number of further additional and optional features of the invention are shown, in step 105 environmental measurements are made. These measurements may include, for example and without limitation, surface slope, surface conditions and wind speed and direction information, and aircraft position in relation to the slope and wind direction for the aircraft being weighed. These measurements may be obtained from aircraft air data instruments and onboard instruments. Such instruments may include gyroscopic instruments that measure rate of change of attitude, including the directional gyro, the attitude indicator, or the artificial horizon; atmospheric instruments including the altimeter and the air speed indicator which work on air pressure; active radar instruments which work by reflecting radio waves, such as a radar altimeter or storm radar; passive radio instruments which work by reference to ground radio beacons, such as VHF omni range, TACAN, automatic direction finder, GPS, loran etc.; engine instruments that measure air characteristics, fuel flow, combustion temperature, RPM, etc.; and any other data instruments internal to the aircraft. This list is given as examples and should not be considered limiting. Data may also be obtained from the airport or from any external instruments. In this embodiment, in step 103 the power supplied and the reaction produced is compared to a database additionally containing information for a range of weather conditions, in particular ground temperature and tire temperature (which impact on rolling friction), as well as rain, snow, etc., and the power and reaction results for the aircraft in question are compared with the results for the same or similar aircraft model, surface, and weather conditions, etc.

In a further optional step 106 the weight estimate may be transmitted to ground staff or internal airport staff via radio signals or other wireless transmission means or other known transmission means from the aircraft and be displayed on electronic equipment held by said ground staff or within the airport. The result may be transmitted aurally to ground or airport staff.

In operation, the aircraft weight may be estimated by moving the aircraft only a small distance on the ground. This would allow a weight estimate to be made during loading, in order to assess cargo and/or fuel weights and whether the cargo or fuel should be adjusted for ideal takeoff weight or performance or range or any other parameter. Alternatively the method of the invention may be used to determine whether or not the aircraft weighs more than a certain value by supplying the electrical rotating machine with just enough power so that the aircraft would only move if its weight was greater than that certain value. Thus, as long as the aircraft does not move with this amount of power, it is known to weigh more than the certain weight. Weight may also be calculated at any point during a taxi run; for example, at the gate, at the start of the runway immediately before the takeoff roll, or at any point in between. Data may be gathered during a period of taxi and used to give a more accurate weight estimate at the end of that period.

In a further aspect of the invention, a method of estimating the amount of fuel needed for a journey is disclosed. Since fuel needed for a journey is related to and can be estimated from aircraft weight, using the present invention to weigh an aircraft reduces the risk of said aircraft having insufficient fuel for its journey, and reduces the extra cost incurred by carrying more fuel than necessary. In another aspect of the invention, the weight estimate may be transmitted to an automatic fuel loader and used to automatically or manually determine the amount of fuel needed for a journey. The weight estimate may thus be used to automatically load the correct amount of fuel into the aircraft and balance it on board according to desired center of gravity. Alternatively, the weight estimate may be viewed by ground staff manning the fuel loader who then load the correct amount of fuel. Alternatively, the weight estimate may be used to detect whether sufficient fuel has been loaded and visual or audio warning signals or prompts may be sent to the pilot or to ground and/or airport staff to warn of insufficient or excessive fuel.

In a further aspect of the invention, a method of obtaining more precise passenger, luggage, and other cargo loading information is disclosed. Using the invention to weigh the aircraft, and using the weight estimate in conjunction with fuel loading information, enables a centre of gravity to be more accurately estimated and allows for more precise loading information, as well as reducing the risk of the aircraft being imbalanced from having a non-optimal center of gravity. The weight estimate may be further used to automatically redistribute the fuel on board the aircraft in order to optimize the aircraft's center of gravity.

The invention may also be used as a method by which an aircraft operator can improve their existing methods of calculating weights and determining fuel loading etc. Data from the present invention can be used to assess accuracy of existing methods and lead to significant savings to the operator.

The invention may also be applied to diagnostic purposes for undercarriage and other performance criteria by logging data relating to weight profile data for an aircraft moving over a particular route on the tarmac, for example, tracking the power used by the aircraft when leaving a particular gate.

The invention may also be used for fault detection, for example by comparing the estimated weight with an expected weight inputted by the pilot, and alerting a pilot if there is a significant difference.

Figure 2:
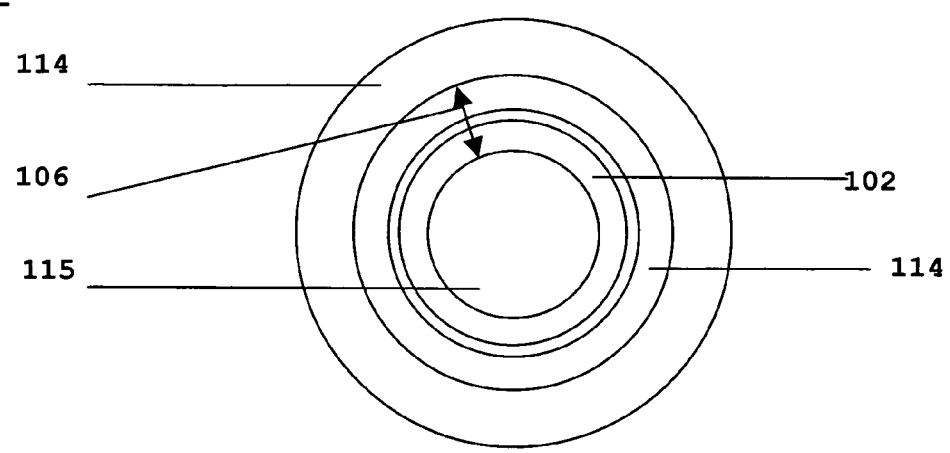
FIG. 2 shows a diagrammatic representation of a cross-sectional view of a slotless machine of the present invention.

The electrical rotating machine may be a HPO (high phase order) slotless AC induction machine of the kind shown in schematic form in FIG. 2, comprising an external electrical member 201 attached to a supporting frame 214 and an internal electrical member 202 attached to a supporting core 215; one or both supports are slotless, and the electrical member attached thereto comprises a number of surface mounted conductor bars separated from one another by suitable insulation. An airgap 206 features between the magnetic portions of core and frame. Since the supports do not have teeth, airgap 206 extends between core 215 and frame 214, to include the region filled by the electrical members. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

Figure 3:
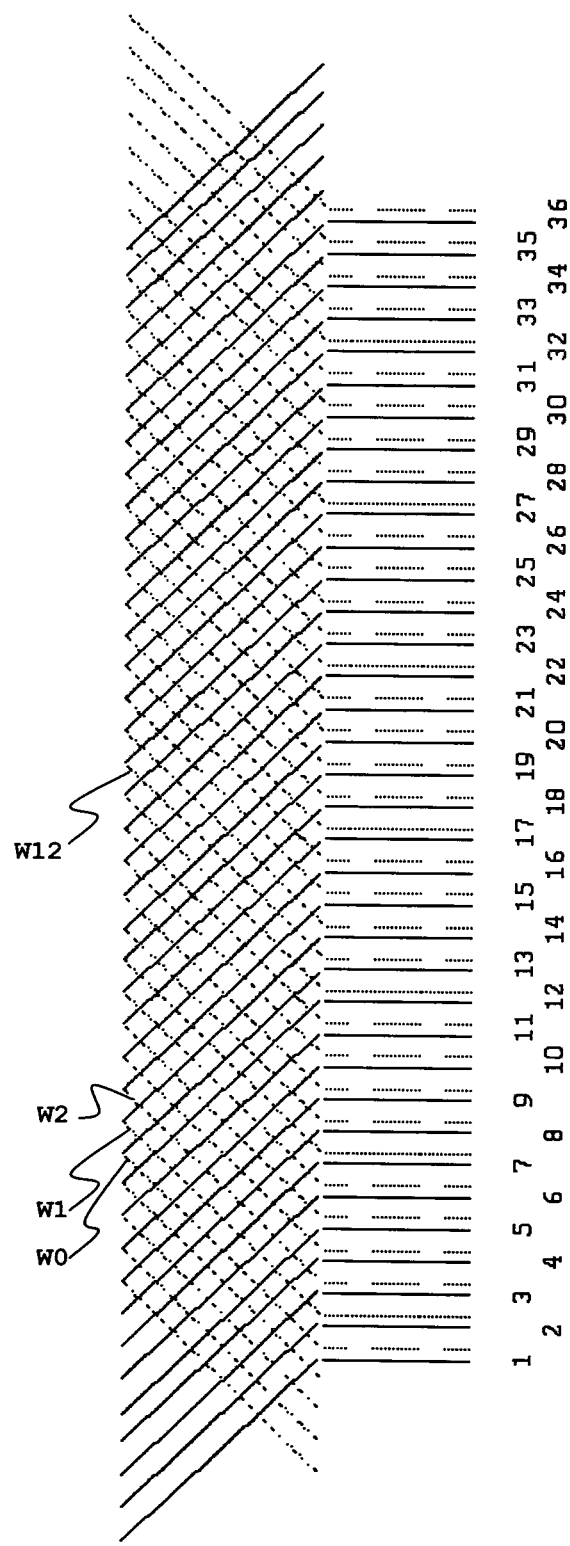
FIG. 3 is a winding schematic of a 36 slot, 36 phase machine with a short pitch winding.

The electrical rotating machine may be a HPO short-pitched AC induction machine having the winding distributed over several slots, there is a reduction in the combined induced electromotive force. The individual coils of each winding will have a different spatial orientation due to the slots and there will be a phase difference between them. Referring now to FIG. 3, a winding schematic is provided of a 36 slot, 36 phase machine with a short pitch winding according to the present invention. The present invention is not limited to any particular number of slots or phases, and the example is given for exemplary purposes only. Stator slots are numbered 1-36, representing the stator slots. The lines adjacent the slots each represent the winding in that slot. The 36 windings are numbered W0-W35, only a few of which are marked, for clarity. Each winding is a different driven phase. The bend in each winding on the diagram represents the stator end turn and renders each winding as two halves, a supply half and a back half. The back half always has a phase angle difference of 180 ED from the supply half. Each winding has a pitch of 1:13, which represents a short pitch winding and the base number of poles, B, is 2. The slots containing the supply half and the back half of each phase are 120 RD apart from one another on the stator. The windings are concentrated, meaning that each half winding is not distributed over more than one slot. An N phase power supply supplies N voltages and currents to provide each winding with an electrical phase. The two winding halves in any slot are 60 ED out of phase from one another. They are enough in phase to produce a reasonably combined slot current at 150 ED. However, since the different winding halves occupying each slot are somewhat out of phase, the effective slot current is something less than the sum of the two half currents, resulting in higher voltage and lower current. The efficiency of magnetic field production is reduced, but remains acceptable. The degree to which the voltage/current ratio is increased is measured by the chording factor, Kc, applied to the turn count of the winding. When a winding is full pitch, the Kc for all odd order harmonics is 1, and the Kc for all even order harmonics is 0. A harmonic order that produces a Kc of zero is unable to drive the machine. Therefore, only odd order harmonics can drive a full pitch wound machine. However, in any short pitch winding machine, each harmonic order may produce a different Kc, dependent on the actual winding pitch. In the machine of FIG. 4, the pitch is 0.67 for H=1, 1.33 for H=2, 2 for H=3, 2.67 for H=4, and 3.33 for H=5. H=1, H=2, H=4 and H=5 all produce a Kc of 0.87, and are therefore able to drive the machine. However, in the same machine, H=3 has a Kc of 0, so is prohibited.

Figure 4A:
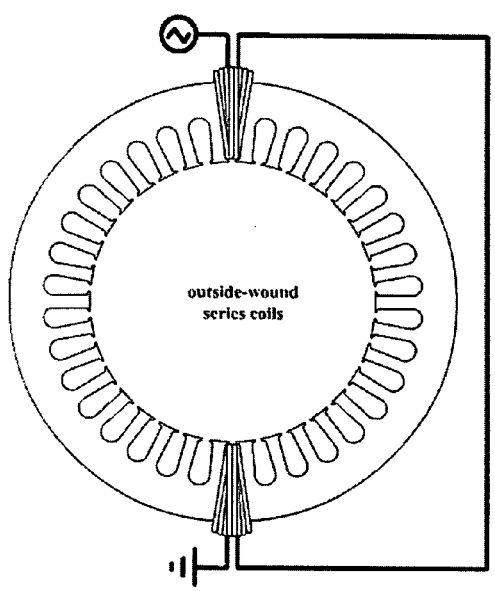
FIG. 4a shows a schematic of outside-wound series coils of the present invention.
Figure 4B:
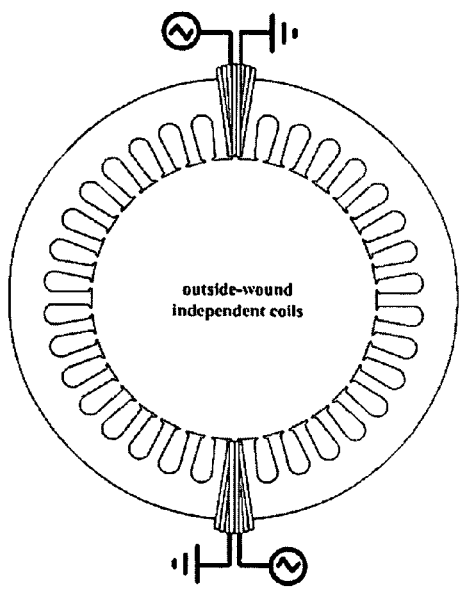
FIG. 4b shows a schematic of outside-wound independent coils of the present invention.
Figure 4C:
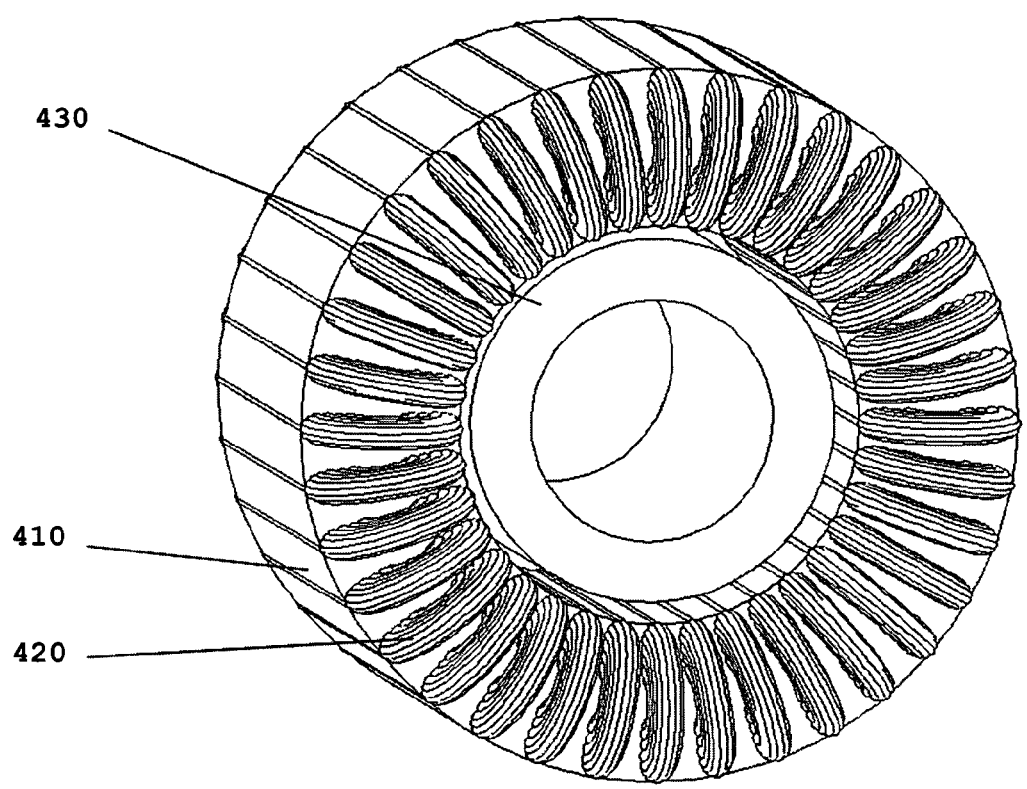
FIG. 4c represents a toroidal wound machine stator of the present invention.
Figure 4D:
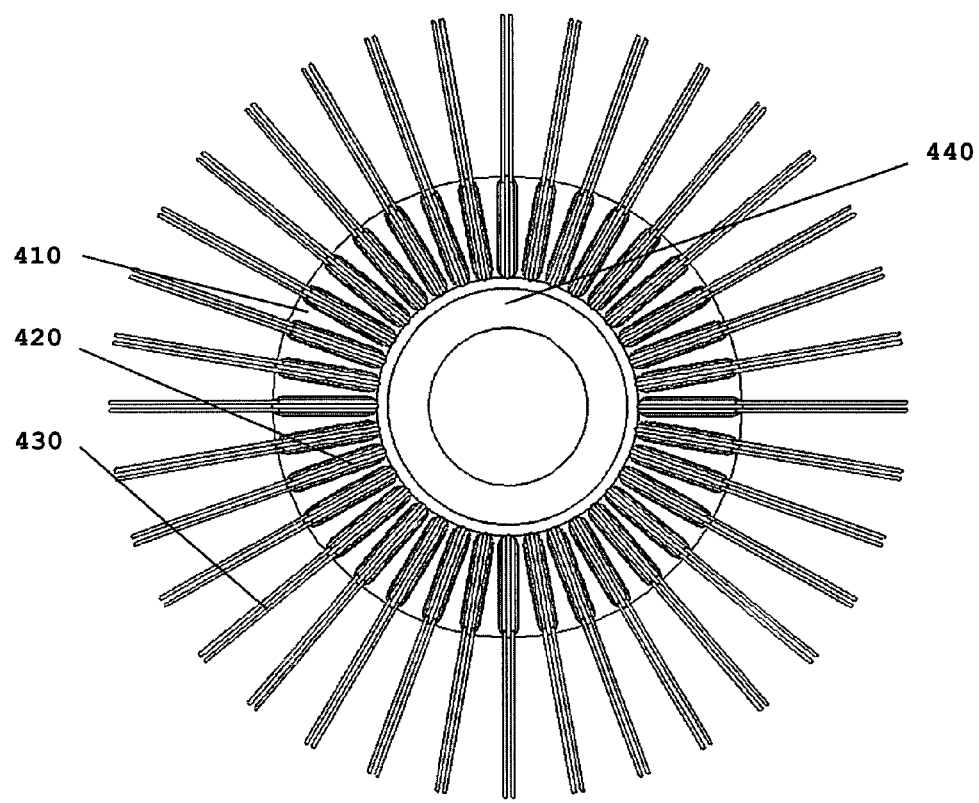
FIG. 4d represents a toroidal wound machine of the present invention showing phase terminals.

The electrical rotating machine may be a HPO toroidally-wound AC induction machine comprising stator coils wound around the inside and outside of a stator. The machine may be used with a dual rotor combination, so that both the inside and outside of the stator may be active. Even order drive harmonics may be used, if the pitch factor for the windings permits them. In one embodiment of this motor-generator machine, an AC electrical rotating apparatus is composed of: a rotor, a substantially cylindrically shaped stator that has one surface that faces the rotor, and a number of conductive coils. Each coil is disposed in a loop wound toroidally around the stator. A drive means, for example an inverter, provides more than three different drive phases to the coils. In a further embodiment, the machine is equipped with teeth or slots for lending firm support to said coils. The slots may be on the stator surface that faces the rotor or also on the opposite stator surface. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a further alternative, where two coils or more have a 180 electrical degree phase angle difference between them, they may be connected in anti-parallel to the same drive phase. The AC machine coils may be connected and driven in a number of ways, including but not restricted to: a star connection and a mesh connection. It is preferable that the drive means, for example, the inverter, be capable of operating with variable harmonic drive, so that it may produce the impedance effect. In one embodiment, the coils are connected with short pitch windings. In a preferred embodiment, the coils are connected to be able to operate with 2 poles, or four poles, under H=1 where H is the harmonic order of the drive waveform. The coils may be connected together in series, parallel, or anti-parallel. Such a machine has an outside-wound stator, in which the conductor forms a loop, not via end turns as in the prior art, but via the outside of the stator. Assuming the stator is shaped like a hollow cylinder, each coil is wound down an internal wall of the cylinder, across the bottom cylinder wall, back up the corresponding outside wall of the cylinder, and across the top cylinder wall. The rotor is internal to the stator, and only the portion of the coil that is internal to the stator cylinder is active. A large number of coils are placed around the stator circumference. FIG. 4a is simplified to show only two coils. These are connected in series, in a two pole configuration, as is commonly employed. With reference now to FIG. 4b, a toroidal wrapped motor is shown, in which coils are each independently driven. With reference now to FIG. 4c, a fully wound view of stator 410 is provided. Stator 410 is equipped with slots on the inside and out. Rotor 430 is internal to stator 410. 36 coils 420 are individually wrapped around stator 410. Wrapping the coil around the outside of the stator in this fashion provides a design that is easier to wind, can have excellent phase separation, and allows independent control of the current in each slot. This eliminates many cross stator symmetry requirements. With reference now to FIG. 4d, a stator equivalent to FIG. 4c is shown, with two terminals 440 shown for each coil. Terminals 440 may be connected in series or parallel to other coils, and are driven by inverter outputs.

Figure 5:
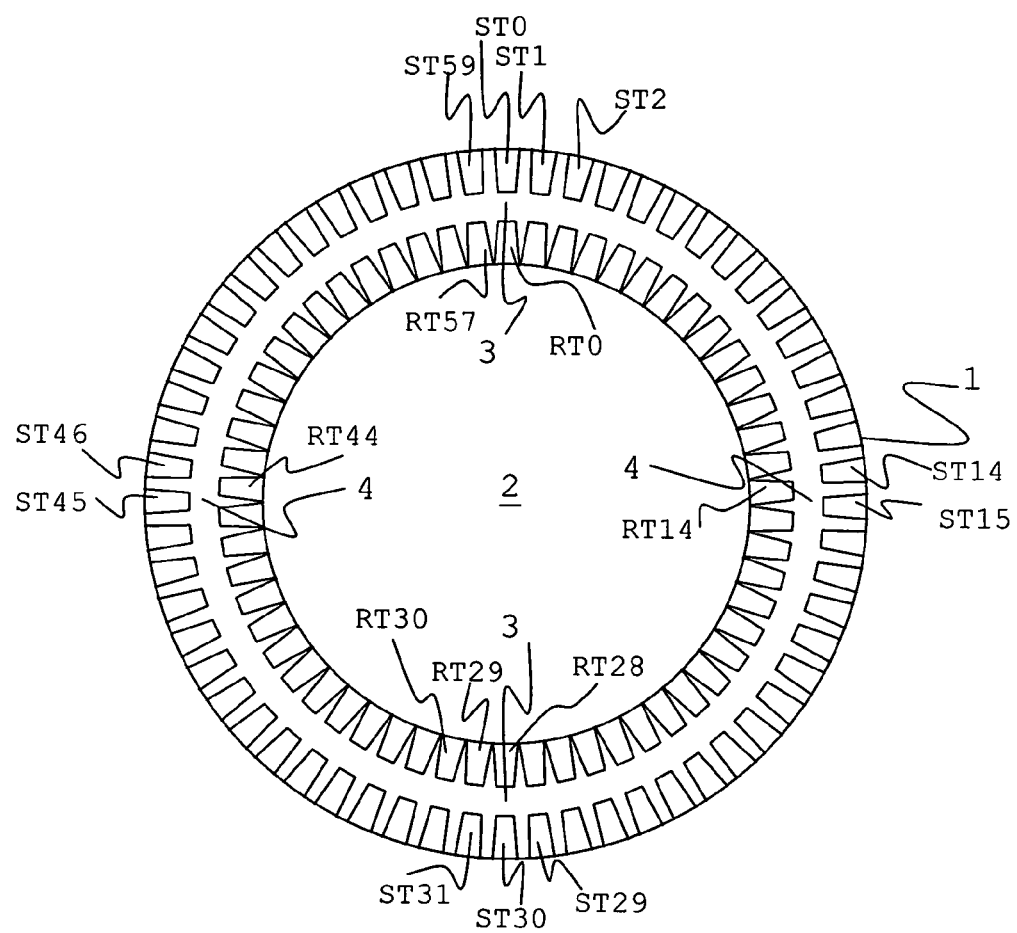
FIG. 5 shows a rotor and stator for a combination inductance/reluctance machine.

The electrical rotating machine may be a HPO motor-generator machine comprising an induction and switched reluctance motor designed to operate as a reluctance machine at low speeds and an inductance machine at high speeds of the type shown in FIG. 5. Stator 1 and rotor 2 each have a high but different number of teeth. The size, dimensions, and spacing of the teeth are intended for purposes of illustration, and are not intended to replicate reality. As may be seen on the diagram Rotor 2 has 58 teeth RT0-RT57, and stator 1 has 60 teeth, ST0-ST59. Only some of the teeth are labeled, for clarity. Both rotor 2 and stator 1 have windings that are standard for induction machines—these are not shown on the diagram, for clarity. There are 60 slots between stator teeth, each containing a different winding phase. The back sides of each winding are wrapped around the outside of the stator, in a toroidal fashion, as described above. Software suitable for both operations, such as, but not limited to, PWM control is used to provide electrical current to stator windings. Drive means synthesizes N phases per pole of electrical current for the windings of stator 1. In this example, N equals 30, and the drive means consists of 60 inverter outputs, each winding of each pole being separately energized. 30 inverter outputs would have sufficed if the windings of the same phase in opposite poles would have been connected together (in reverse), as is common in two pole machines. Yet in the current example, each winding is separately driven, to allow second harmonic to be able to be used as a drive waveform. The drive waveform in the stator winding phases produces a rotating magnetic field. Rotor 2 becomes magnetized by the rotating magnetic field produced by the windings of stator 1. The magnetic field has points of maximum magnetic field strength. The number of such points is usually equal to the number of poles, and the points of maximum magnetic field strength are usually the center of each pole. The number of poles of a magnetic field depends on the base pole count, the number of winding phases and the harmonic order of the drive waveform. Each pole of the magnetic field has a strongly magnetic center and surrounding regions where the magnetic field is gradually weaker. The angular distance between pole centers is equal to 360/P, where P is the number of poles. The angular distance between pole centers represents the entry and exit points of a flux path on the rotor circumference. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The rotor structure reacts to a particular drive waveform harmonic to produce a reluctance torque that rotates the rotor. For a different harmonic drive, substantially negligible reluctance torque is produced but induction based torque is produced to rotate the rotor. The rotor and stator may have a different high number of very small teeth causing the rotor to move much more slowly than the magnetic poles. The rotor may be designed with a number of salient poles or flux guides that produces substantial reluctance torque under the operation of a magnetic field of a certain pole count, but produces negligible reluctance torque, and substantial inductance-based torque, under the operation of a second magnetic field with a second pole count. The stator windings may be connected mesh or may be wrapped in a toroidal fashion around the stator.

While the above description contains many specificities, these should not be construed as limitations on the scope of the invention, but as exemplifications of the presently preferred embodiments thereof. Many other ramifications and variations are possible within the teachings of this invention. Thus any of the electrical rotating machines disclosed above may be beneficially applied to the present invention. Further, instead of a database, figures may be calculated directly using known data (such as rolling friction from the tire, temperature data, wind resistance, slope, position, direction, surface conditions etc, all of which may be obtained from aircraft air data instruments as described herein and all onboard instruments, external instruments, and airport instruments) and other known figures, and known equations.

The invention claimed is:

1. A method comprising estimating weight of an aircraft, wherein said aircraft has an undercarriage fitted with an electrical rotating machine comprising a motor that propels the aircraft on the ground, said method further comprising:
   (a) supplying power to the electrical rotating machine and measuring power supplied directly using sensor means or indirectly using current and voltage supplied to the electrical rotating machine to obtain a power measurement;
   (b) when said aircraft is propelled on the ground, measuring a change in one or more of speed, acceleration, and torque in response to power supplied to said electrical rotating machine, wherein speed is measured by measuring speed of said aircraft or an aircraft component rotating with a speed proportional to a speed of said aircraft to obtain a speed measurement; acceleration is measured by measuring acceleration of said electrical rotating machine or a component of said electrical rotating machine with an acceleration proportional to acceleration of the aircraft to obtain an acceleration measurement; and torque is measured within the electrical rotating machine or at a structure that displays torque proportional to torque of said electrical rotating machine to obtain a torque measurement;
   (c) building a database of speed/power, acceleration/power, and torque/power relationships for many models of aircraft moving on many ground surfaces with various cargo loads comprising a range of weights and comparing the power measurement and one or more of the speed measurement, acceleration measurement, and torque measurement with database relationships for a same or a most similar model aircraft as said aircraft on a same or most similar ground surface as said ground surface;
   (d) obtaining an estimate of weight of said aircraft from a comparison of said power measurement and one or more of said speed measurement, said acceleration measurement, and said torque measurement with said database relationships for a same or similar aircraft as said aircraft on a same or similar ground surface as said ground surface;
   (e) verifying the estimate of weight obtained for said aircraft and entering said estimate of weight into said database, thereby expanding the speed/power, acceleration/power, and torque/power relationship data for aircraft on ground surfaces in said database and increasing precision of weight estimates as said data is expanded; and
   (f) entering a verified obtained estimated weight each time an estimate of aircraft weight is obtained.

2. The method described in claim 1, wherein power supplied to the electrical rotating machine to move the aircraft on the ground is measured indirectly by first measuring the current and voltage applied to the electrical rotating machine to move the aircraft and then calculating the power supplied to the electrical rotating machine to obtain said power measurement.

3. The method described in claim 1, further comprising displaying the estimated aircraft weight on the aircraft or transmitting the estimated aircraft weight to a location remote from the aircraft for use by ground airport staff.

4. The method described in claim 1, further comprising using the estimated weight of said aircraft to calculate an amount of fuel needed for a particular journey.

5. The method described in claim 4, further comprising the steps of first transmitting the calculated amount of fuel needed to a fuel loader and then using the fuel loader to load the calculated amount of fuel onto the aircraft.

6. The method described in claim 4, further comprising the steps of comparing the calculated amount of fuel needed to an amount of fuel already on the aircraft and communicating results of the fuel comparison to ground, aircraft, or airport staff so appropriate action can be taken to load the correct amount of fuel.

7. The method described in claim 1 further comprising using the estimate of weight of said aircraft to calculate a centre of gravity of the aircraft and using a calculated centre of gravity to distribute fuel, passengers, luggage, and other cargo to obtain an optimum centre of gravity for said aircraft.

8. The method described in claim 1, further comprising measuring environmental and surface conditions external to said aircraft to obtain environmental and surface data, wherein said database further comprises selected environmental data measurements for said various models of aircraft, and said environmental and surface data is compared to said database selected environmental data measurements for a same or similar model of aircraft as said aircraft.

9. The method described in claim 1, wherein the electrical rotating machine that propels the aircraft undercarriage to move the aircraft on the ground is an electrical rotating machine selected from the group consisting of HPO slotless AC induction machines, HPO short-pitched AC induction machines having more than 18 phases, HPO toroidally-wound AC induction machines, and combination HPO induction and switched reluctance machines.

10. The method described in claim 1, wherein the power supplied to the electrical rotating machine to propel the aircraft on the ground is an amount of power insufficient to change speed, acceleration, or torque of said aircraft or said aircraft component, causing speed, acceleration, or torque to measure zero, so that comparing the power measurement and the zero speed, acceleration, or torque measurement with said database relationships for a same or similar aircraft on a same or similar ground surface produces a minimum value for the estimate of weight of the aircraft.

11. The method described in claim 1, wherein said estimate of weight of said aircraft is logged in the database to increase the precision of data in said database or for use in fault detection.

12. The method described in claim 1, wherein the database is an electronic database, and said method is conducted electronically.

13. The method described in claim 1, wherein the database consists of graphs or tables, and the steps (c) and (d) are conducted manually.

14. The method described in claim 1, wherein said method is performed in combination with existing aircraft weight methods to obtain an estimate of weight of the aircraft.

15. The method described in claim 1, wherein said method is performed to produce a single or average estimated aircraft weight at one or more times or events in ground movement of an aircraft comprising at a start of taxi, immediately before a takeoff roll, and repeatedly over a period of taxiing.

16. An apparatus for performing the method for determining the weight of an aircraft described in claim 1, wherein said apparatus comprises
   (a) a self-propelled aircraft undercarriage with an electrical rotating machine comprising an electric motor fitted in a drive wheel of said undercarriage that propels said aircraft on the ground;
   (b) power sensing means for sensing and directly measuring power applied to said electric motor;
   (c) current and voltage measuring means, for indirectly measuring power applied to said electric motor;
   (d) one or more of aircraft speed, acceleration, and torque sensing means for sensing a change in speed, acceleration, and torque behavior of said aircraft in response to power applied to said electric motor; and
   (e) a database of power and speed, acceleration, and torque measurements and relationships for a variety of models of aircraft having a variety of weights on the ground under a variety of tarmac and ground conditions.

17. The method of claim 1, wherein said speed measurement is obtained by measuring speed of said aircraft directly using speed sensing means or indirectly by measuring a speed of said aircraft component rotating with a speed proportional to said aircraft speed and calculating speed of said aircraft.

18. The method of claim 1, wherein said speed measurement is obtained by measuring rotational velocity of said electrical rotating machine when said aircraft is moving on the ground and calculating speed of said aircraft.

19. The method of claim 1, wherein said acceleration measurement is obtained by measuring acceleration directly with acceleration sensing means able to determine change in speed per unit of time or indirectly by measuring acceleration of said electrical rotating machine.

20. The method of claim 1, wherein said torque measurement is obtained by measuring torque directly with torque sensing means within said electrical rotating machine, within gears attached to the electrical rotating machine, or on a wheel of said aircraft.

\* \* \* \* \*